(12) United States Patent
Touboul

(10) Patent No.: US 10,063,639 B1
(45) Date of Patent: Aug. 28, 2018

(54) STICKER COMMUNICATION METHOD AND SYSTEM

(71) Applicants: Shlomo Touboul, Kfar Chaim (IL); Marc Berger, Rehovot (IL)

(72) Inventor: Shlomo Touboul, Kfar Chaim (IL)

(73) Assignees: Marc Berger, Rehovot (IL); Shlomo Touboul, Kfar Chaim (IL)

( * ) Notice: Subject to any disclaimer, the term of this patent is extended or adjusted under 35 U.S.C. 154(b) by 0 days.

(21) Appl. No.: 15/817,501

(22) Filed: Nov. 20, 2017

(51) Int. Cl.
| | |
|---|---|
| *H04B 7/00* | (2006.01) |
| *H04L 29/08* | (2006.01) |
| *H04W 4/00* | (2018.01) |
| *H04W 4/80* | (2018.01) |
| *H04W 84/18* | (2009.01) |

(52) U.S. Cl.
CPC ............. *H04L 67/12* (2013.01); *H04W 4/008* (2013.01); *H04W 4/80* (2018.02); *H04W 84/18* (2013.01)

(58) Field of Classification Search
USPC ........................................ 455/500, 41.1–41.3
See application file for complete search history.

(56) References Cited

U.S. PATENT DOCUMENTS

| | | | | |
|---|---|---|---|---|
| 9,451,573 | B2* | 9/2016 | Erickson | H04W 52/0212 |
| 9,629,193 | B2* | 4/2017 | Erickson | H04W 76/023 |
| 9,634,928 | B2* | 4/2017 | Choudhury | H04L 45/42 |
| 9,712,963 | B2* | 7/2017 | Kim | H04W 4/021 |
| 2016/0094398 | A1* | 3/2016 | Choudhury | H04L 45/42 370/254 |
| 2018/0001184 | A1* | 1/2018 | Tran | A63B 71/145 |

* cited by examiner

*Primary Examiner* — Fayyaz Alam
(74) *Attorney, Agent, or Firm* — Marc A. Berger

(57) ABSTRACT

A sticker attachable to an item of goods, including a processor, a storage communicatively coupled with the processor, storing a unique address for the sticker, storing operation code for the processor, and storing a plurality of data messages, wherein data messages include an address of a source sticker, an address of a destination computer and data relating to current properties of the source sticker, a wireless communicator for wirelessly transmitting and receiving data messages, and a power source supplying power to the processor, the storage and the wireless communicator, wherein the operation code includes instructions causing the processor to transmit data messages stored in the storage via the wireless communicator to currently nearby stickers that are within range of the wireless communicator, to receive data messages from the nearby stickers, and to store the received data messages in the storage.

19 Claims, 16 Drawing Sheets

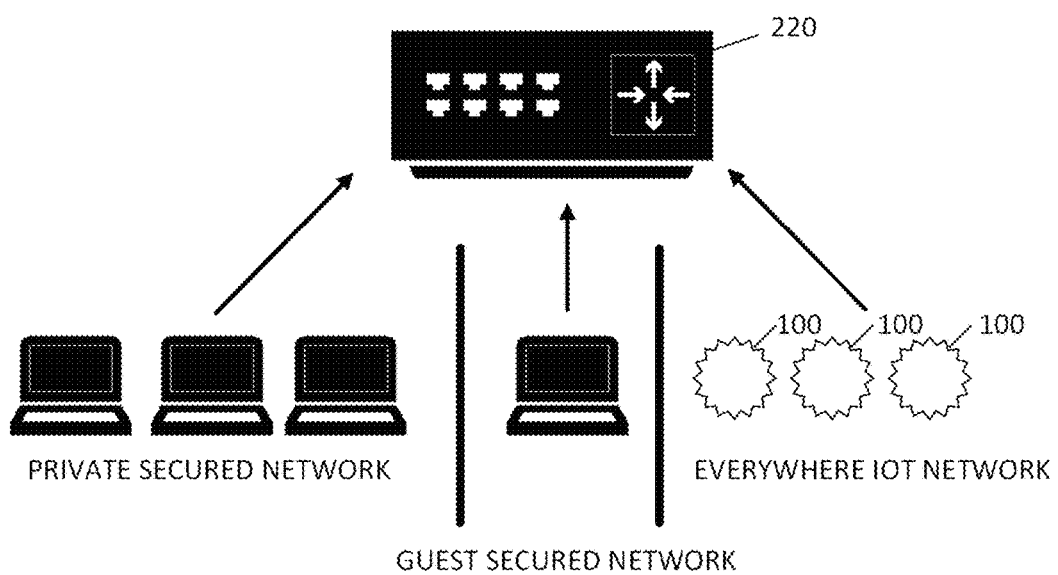
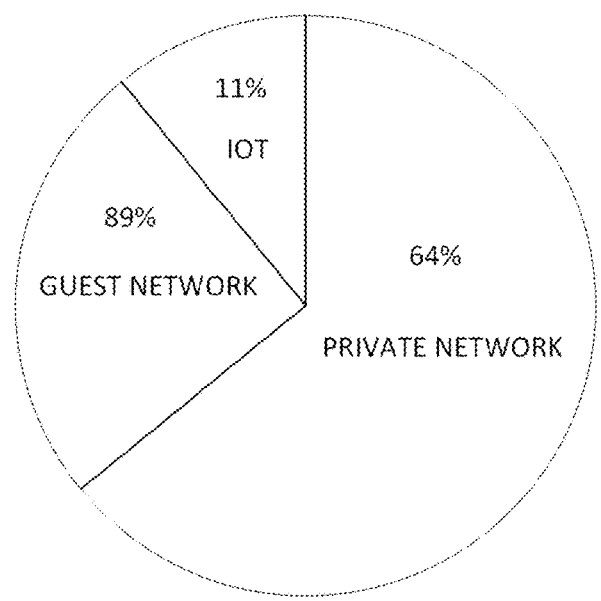
FIG. 16

STICKER COMMUNICATION METHOD AND SYSTEM

FIELD OF THE INVENTION

The present invention relates to a world-wide network of stickers and other Internet of Things (IoT) devices.

BACKGROUND OF THE INVENTION

The relevant background relates to IoT devices and to iBeacons.

The IoT is a network of physical devices, vehicles, home appliances, and other items embedded with electronics, software, sensors, actuators, and network connectivity which enable these objects to collect and exchange data. Each thing is uniquely identifiable through its embedded computing system but is able to interoperate within the existing Internet infrastructure. The IoT allows objects to be sensed or controlled remotely across existing network infrastructure, creating opportunities for more direct integration of the physical world into computer-based systems, and resulting in improved efficiency, accuracy and economic benefit in addition to reduced human intervention. "Things", in the IoT sense, can refer to a wide variety of devices such as heart monitoring implants, biochip transponders on farm animals, cameras streaming live feeds of wild animals in coastal waters, automobiles with built-in sensors, DNA analysis devices for environmental/food/pathogen monitoring, or field operation devices that assist firefighters in search and rescue operations. These devices collect useful data with the help of various existing technologies and then autonomously flow the data between other devices. The quick expansion of Internet-connected objects is expected to generate large amounts of data from diverse locations, with the consequent necessity for quick aggregation of the data, and an increase in the need to index, store, and process such data more effectively.
(Source: Wikipedia, https://en.wikipedia.org/wiki/Internet_of_things).

iBeacon is a protocol developed by Apple. Various vendors have made iBeacon-compatible hardware transmitters—typically called beacons—a class of Bluetooth low energy devices that broadcast their identifier to nearby portable electronic devices. The technology enables smartphones, tablets and other devices to perform actions when in close proximity to an iBeacon. iBeacon is based on Bluetooth low energy proximity sensing by transmitting a universally unique identifier picked up by a compatible application or operating system. The identifier and several bytes sent with it can be used to determine the device's physical location, track customers, or trigger a location-based action on the device such as a check-in on social media or a push notification. iBeacon can also be used with an application such as an indoor positioning system, which helps smartphones determine their approximate location or context. With the help of an iBeacon, a smartphone's software can approximately find its location relative to an iBeacon in a store. Brick and mortar retail stores use the beacons for mobile commerce, offering customers special deals through mobile marketing, and enable mobile payments through point of sale systems. Applications that can be deployed using beacons include distributing messages at a specific point of interest, for example a store, a bus stop, a room or a more specific location like a piece of furniture or a vending machine. iBeacon differs from other location-based technologies as the broadcasting device (beacon) is only a 1-way transmitter to the receiving smartphone or receiving device, and necessitates a specific application installed on the device to interact with the beacons. This ensures that only the installed application, not the iBeacon transmitter, can track users as they passively walk around the transmitters. iBeacon compatible transmitters come in a variety of form factors, including small coin cell devices, USB sticks, and generic Bluetooth 4.0 capable USB dongles.
(Source: Wikipedia, https://en.wikipedia.org/wiki/IBeacon)

Conventional IoT requires devices to communicate via the Internet. IoT devices are relatively expensive because of their hardware and power. As such, mass production of disposable IoT devices is currently not economical, and certain IoT applications are currently impractical.

SUMMARY

The present invention provides low cost low power Internet of Things (IoT) devices in the form of disposable stickers, which communicate locally with one another over short ranges via a novel world-wide sticker-to-sticker network. The present invention also provides efficient quality control, including environmental and defect control, for items of goods that are moved about.

Specifically, the present invention relates to stickers that are attached to items of goods. The stickers have processors, data storages, and wireless communicators for transmitting and receiving messages. The stickers have power sources that are self-generating or standalone low power supplies. The stickers are on-the-go; the items of goods to which they are attached are moved from place to place, possibly from country to country, by land, by sea or by air, as they are delivered between factories and distribution centers such as supermarkets, pharmacies, hospitals, distributors, resellers, fabrication/assembly and refactoring facilities.

The stickers have interfaces to sensors, which provide information about the stickers, the goods to which the stickers are attached and their vicinities. The stickers have interfaces to drivers, which operate devices coupled with the stickers.

The stickers form a world-wide network, and implement protocols for exchanging messages between nearby stickers that are currently within communication range of one another. Some of the stickers are enhanced, so as to be Internet-enabled for transmitting via the Internet messages originating from stickers and addressed to destination computers, and for receiving via the Internet messages originating from computers and addressed to destination stickers via the Internet. These enhanced stickers serve as endpoints of the sticker-to-sticker network for messages that enter or exit the network.

As such, management and user applications running on computers are able to control operation of the stickers by operating devices coupled to the stickers in response to receiving information from sensors near the stickers, thereby ensuring optimal quality control for the items of goods to which the stickers are attached. The subject invention makes it possible (i) to advantageously avoid spoilage of goods due to environmental conditions, (ii) to recall before use items of goods that are defective, (iii) to identify shortcomings in the ways goods are transported and delivered, (iv) to manage inventory, and (v) to implement vendor-specific functions, such as reading vendor-specific parameters, and activating vendor-specific drivers in response to the parameter readings.

There is thus provided in accordance with an embodiment of the present invention a sticker attachable to an item of goods, including a processor, a storage communicatively coupled with the processor, storing a unique address for the sticker, storing operation code for the processor, and storing a plurality of data messages, wherein data messages include an address of a source sticker, an address of a destination computer and data relating to current properties of the source sticker, a wireless communicator for wirelessly transmitting and receiving data messages, and a power source supplying power to the processor, the storage and the wireless communicator, wherein the operation code includes instructions causing the processor to transmit data messages stored in the storage via the wireless communicator to currently nearby stickers that are within range of the wireless communicator, to receive data messages from the nearby stickers, and to store the received data messages in the storage.

There is additionally provided in accordance with an embodiment of the present invention a communication system for stickers, including a plurality of stickers, each sticker including a processor, an internal clock providing a current time, a location identifier providing a current location, a storage communicatively coupled with the processor, storing a unique address for the sticker, storing operation code for the processor, and storing a plurality of data messages, wherein a data message includes an address of a source sticker, an address of a destination computer, a current time, a current location, and data relating to current properties of the source sticker, a wireless communicator for wirelessly transmitting and receiving data messages, and a power source supplying power to the processor, the storage and the wireless communicator, wherein the operation codes of the stickers cause the processors of the stickers: to transmit data messages stored within the stickers' storages to other stickers that are currently nearby, within range of the stickers' wireless communicators, to receive data messages stored within storages of other stickers that are currently nearby to the stickers, within range of the stickers' wireless communicators, to store data messages received from nearby stickers within the stickers' storages, and to further transmit, by a subset of the stickers, data messages stored in the stickers' storages to the data messages' respective designated destination computers via a network, when there are access points to the network currently nearby the stickers, within range of the stickers' wireless communicators.

There is further provided in accordance with an embodiment of the present invention a method of communication among a plurality of stickers, including for each one of a plurality of uniquely addressable stickers, each sticker including a storage storing messages and including a wireless communicator transmitting and receiving messages, transmitting messages stored within the sticker's storage to other stickers that are currently nearby to the sticker, within range of the sticker's wireless communicator, wherein a message includes a source address, a destination address, and data, receiving, by each sticker, messages stored within storages of other stickers that are currently nearby to the sticker, within range of the sticker's wireless communicator, determining, by each sticker, if a received message is addressed to the sticker, if the determining is affirmative, then performing, by the sticker, instructions based on data in the received message, and otherwise, storing, by the sticker, the received message within the sticker's storage, further transmitting, by each one of a subset of the stickers, messages stored in the sticker's storage to the messages' respective destination addresses via a network, when there is an access point for the network currently nearby the sticker, within range of the sticker's wireless communicator, and further receiving, by each one of the subset of the stickers, messages from a computer via the network, when there is an access point for the network currently nearby the sticker, within range of the sticker's wireless communicator.

The following definitions are employed throughout the specification.

CONTROL MESSAGE—The term control message as used herein refers generally to an electronic message containing an instruction for a sticker, or an acknowledgement for a sticker.

DATA MESSAGE—The term data message as used herein refers generally to an electronic message containing data regarding properties and/or state of a sticker.

ENHANCED STICKER—The term enhanced sticker as used herein refers generally to a sticker that is capable of transmitting and receiving messages over a wide area network such as the Internet, via network access points.

MANAGEMENT APPLICATION—The term management application as herein refers generally to an application that configures stickers. The management application may receive alerts and generate event logs.

MESSAGE—The term message as used herein includes data messages, control messages and other types of messages.

POLICY—The term policy as used herein refers generally to the manner in which message priority levels are set.

PRIORITY—The term priority as used herein refers generally to the priority of a message, which generally relates to the urgency and/or severity of the message.

PROPERTY—The term property as used herein refers to a physical property in the vicinity of a sticker, or to a data attribute of a sticker.

STATE—The term state as used herein refers to an operational state of a sticker.

STICKER—The term sticker as used herein is intended to include stickers, tags and labels. As such, a sticker is not limited to an adhesive, and is intended to broadly represent something that is affixed to, attached to, clasped to, clipped to, fastened to, glued to, locked onto, screwed onto, taped to, tied to, or mounted on or near an item of goods.

USER APPLICATION—The term user application as used herein generally refers to an application that controls functioning of stickers, of stickers' sensors, and of stickers drivers.

BRIEF DESCRIPTION OF THE DRAWINGS

The present invention will be more fully understood and appreciated from the following detailed description, taken in conjunction with the drawings in which:

FIG. 16 is a simplified diagram of a protocol for stickers and other geographically distributed Internet of things (IoT) devices, in accordance with an embodiment of the present invention.

For reference to the figures, the following index of elements and their numerals is provided. Similarly numbered elements represent elements of the same type, but they need not be identical elements.

Table of elements in the figures

Figure 1:
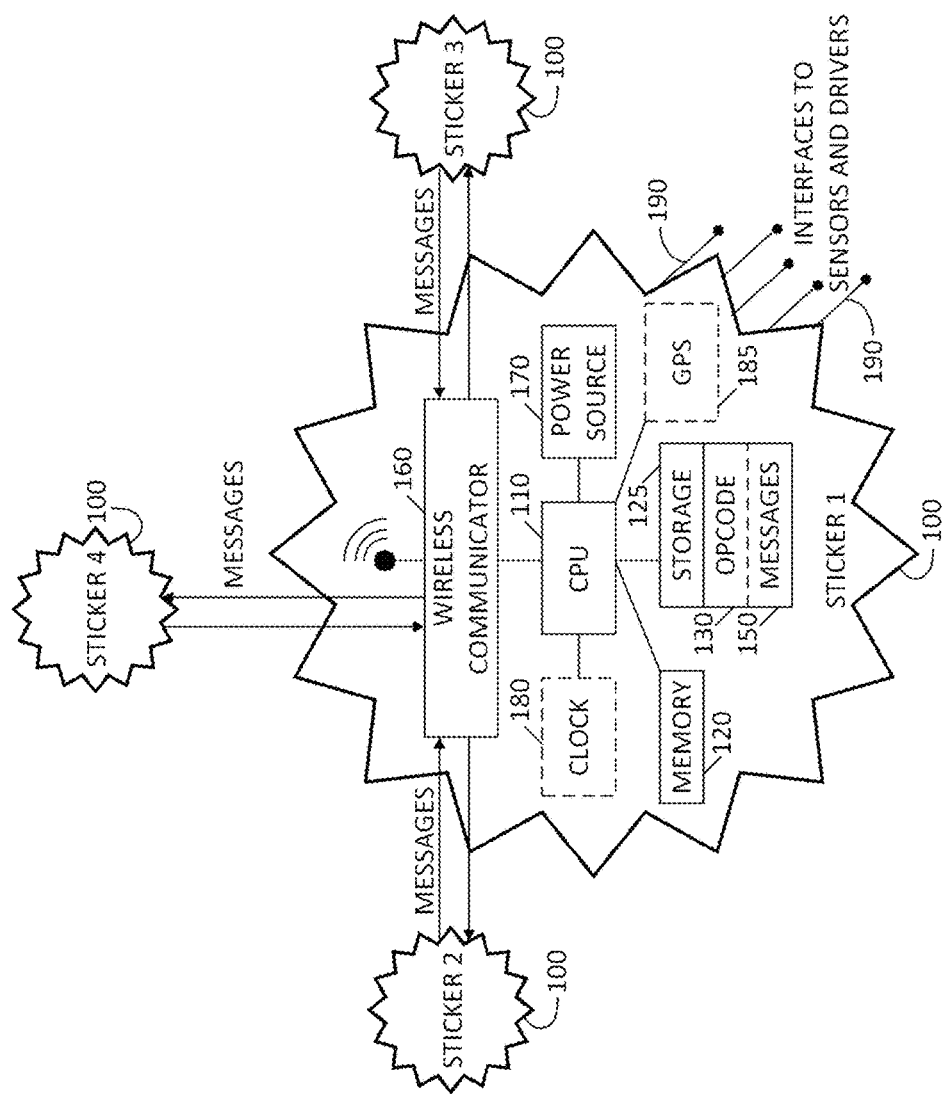
FIG. 1 is a simplified block diagram of a sticker, in accordance with an embodiment of the present invention.

| Element | Description |
|---------|-------------|
| 100 | sticker |
| 101 | enhanced sticker |
| 102-104 | sticker communication ranges |
| 110 | CPU |
| 120 | memory |
| 125 | storage |
| 130 | operation code |
| 131 | application programming interface (API) |
| 132 | messages manager |
| 133 | sensors manager |
| 134 | drivers manager |
| 135 | sticker management client |
| 136 | power manager |
| 137 | message buffers |
| 138 | sticker-to-sticker communication protocol |
| 139 | IP |
| 141 | UDP |
| 142 | small range small packet broadcast |
| 143 | communication interface |
| 144 | sticker-to-Internet communication protocol |
| 150 | messages |
| 151 | header section of message |
| 152 | control section of message |
| 153 | data/instruction section of message |
| 154 | message packet |
| 160 | wireless communicator |
| 170 | power source |
| 180 | clock |

-continued

Table of elements in the figures

| Element | Description |
|---------|-------------|
| 185 | GPS |
| 190 | interfaces to sensors and drivers |
| 191 | thermometer |
| 192 | fan driver |
| 193 | vendor-specific sensor |
| 194 | vendor-specific driver |
| 210 | Internet |
| 220 | Internet access point |
| 230 | computer |
| 240 | world-wide network of stickers |
| 250 | sticker management application |
| 260 | sticker user application |
| 270 | API for sticker message; API for sticker sensors and drivers |
| 310 | solar panel |
| 320 | antenna |
| 330 | local charging broadcast |
| 340 | cellular base station |
| 350 | Wifi hotspot |

Elements numbered in the 1000's are operations of flow charts.

DETAILED DESCRIPTION

Embodiments of the present invention relate to stickers that are attached to items of goods. The items of goods may be containers of consumables such as milk/soft drink bottles, food packages and medicine/chemical containers. The items of goods may be non-consumables such as assembly parts, electronic devices, biological tissues/samples, films, and other goods that benefit from being monitored while in transit.

The stickers have power supplies. The stickers have memories and storages for storing operation code and messages. The stickers are equipped with wireless communicators, and, under control of their operation codes, send messages in an ad-hoc way via a short range sticker-to-sticker network. Each sticker sends messages to nearby stickers that are within range of its wireless communicator. Stickers may be nearby one another inter alia when the items of goods that they are attached to are on the same delivery truck, on the same shelf in a supermarket, in the same supply room, in the same assembly line or in the same cargo transport. Stickers may be nearby one another irrespective of being attached to items of goods, in order to intermediate by transmitting messages to and receiving messages from other stickers.

The messages transmitted in the sticker-to-sticker network are generally of two kinds; namely, data messages and control messages. Data messages report current properties and operational states of a sticker. Properties of a sticker include physical properties which may include inter alia:

location of the sticker,
velocity of the sticker,
acceleration of the sticker,
altitude of the sticker,
temperature at the sticker's location,
air humidity at the sticker's location,
air density at the sticker's location,
vibrations of the sticker,
battery status of the sticker,
light intensity at the sticker's location,
acoustic level at the sticker's location,
presence of smoke at the sticker's location, weight of the item of goods to which the sticker is attached, an indicator of whether or not the item of goods was opened, and data generated by a custom sensor.

Properties of a sticker also include data attributes, which may include inter alia:

"ID"—A sticker may have a unique identifier, generally in the form of an address and number, "Name"—A sticker may have a name, which is not necessarily unique, "Network name"—The network name of a sticker is the name of a private sticker network, or PUBLIC, if the sticker is part of a public sticker network, "Authentication"—A sticker that participates in a private sticker network may have authentication data, "Power level"—an indication of the power level of a sticker, "Health"—The health of a sticker is the result of self-diagnostic testing of the sticker, its sensors and its drivers, status/version of the sticker's operation code, and error/event logs generated by the sticker's operation code.

The operational states of a sticker may be designated by text or binary code. States may include inter alia:

"Standalone state"—A sticker in the standalone state is located randomly, such as on a shelf, or somewhere near items of goods, but not attached to an item of goods. A standalone sticker participates in a sticker network, and transmits and receives messages from other stickers. E.g., standalone stickers may be placed between a supply area with items of goods that have stickers attached, and an enhanced sticker near an Internet gateway, in order to enable communication between the enhanced sticker and the stickers that are attached to the items of goods. The standalone sticker may be attached to a wall or to a door at a location between the supply area and the Internet gateway.

"Attached state"—A sticker in the attached state is attached to an item of goods. Generally a sticker in the attached state operates active sensors and drivers.

"Non-configured state"—A sticker in the non-configured state is a new sticker that has not yet been configured to a specific user application. A sticker in the non-configured state does not communicate with a management application or a user application. A sticker in the non-configured state may nevertheless act as a standalone sticker and transmit and receive messages in a public sticker network.

A data message may include a priority, which generally reflects the severity of the data.

Control messages include instructions or acknowledgements for stickers. The instructions may request that stickers perform specific actions, including inter alia:

activating an LED or such other display, activating a sensor coupled with the sticker, updating the sticker's operation code;

updating vendor-specific code;

configuring itself, and resetting itself.

A control message with an instruction may include a priority, which generally reflects the urgency of carrying out the instruction.

The acknowledgements confirm that messages were received by their intended destinations, in response to which the stickers clear the acknowledged messages from their storages.

At least some of the stickers are further enabled to transmit and receive messages over a wide area network such as the Internet, via network access points. These enhanced stickers transmit messages to destination computers on the Internet and receive messages from source computers on the Internet when an Internet access point is within range of their wireless communicators. As such, the enhanced stickers serve as "endpoints", via which messages enter and exit the sticker-to-sticker network.

Reference is made to FIG. 1, which is a simplified block diagram of a sticker 100, in accordance with an embodiment of the present invention. FIG. 1 shows four stickers 100 that exchange messages with one another. Each sticker includes a CPU 110. CPU 110 may be inter alia:

a system on chip (SoC), and a processor and its peripherals.

Each sticker includes a volatile memory 120 and a non-volatile storage 125. Memory 120 and storage 125 are communicatively coupled with CPU 110. Storage 125 stores a unique ID (not shown) for the sticker, operation code 130 and messages 150. Operation code 130 is described below with reference to FIG. 2. Messages 150 include data messages. A data message contains an ID of a source sticker, an address of a destination computer, and data relating to current properties and states of the source sticker. Messages 150 also include control messages. A control message contains an address of a source computer, an ID of a destination sticker, and an instruction or an acknowledgement for the destination sticker. The anatomy of a message is described below with reference to FIG. 3.

Each sticker includes a wireless communicator 160 and a power source 170. Wireless communicator 160 is communicatively coupled with CPU 110, and wirelessly transmits and receives messages from other stickers 100 under instructions of operation code 130. Wireless communicator 160 may be inter alia a communicator for a personal area network. Wireless communicator 160 may be inter alia:

a Wi-Fi communicator, a cellular communicator, an infra-red communicator, a Bluetooth communicator, a Zigbee communicator, a Z-wave communicator, a wireless USB communicator, a radio frequency communicator, an infra-red communicator, a near-field communicator, a low power wide area network (LPWAN) communicator, a LoRaWAN communicator, a highway addressable remote transducer (HART) communicator, an EnOcean communicator, and a worldwide interoperability for microwave access (Wi-MAX) communicator.

Power source 170 supplies power to CPU 110, to memory 120, to storage 125 and to wireless communicator 160. Power source 170 may be inter alia a battery or a self-generating power source such as:

a solar power source, a miniature chemical reaction source, an RF power source, and a magnetic power source.

When power source 170 is rechargeable, sticker 100 may be charged remotely, as explained below with reference to FIG. 15.

Optionally, sticker 100 includes a clock 180 providing a current date and time, and a GPS 185 providing a current location of sticker 100.

Each sticker includes one or more interfaces 190 to sensors and drivers. The sensors may include sensors for measuring current properties of the sticker and its vicinity, such as:
- a motion detector,
- an accelerometer,
- a barometer,
- an altimeter,
- a thermometer/temperature sensor,
- an air humidity sensor,
- an air density sensor,
- a gaseous sensor,
- an x-ray sensor,
- an ultra-violet sensor,
- an infra-red sensor,
- a smoke detector,
- a scale for measuring weight, and
- a custom sensor.

Data obtained from the sensors is reported in data messages generated by the sticker.

The drivers may include inter alia:
- drivers for activating a display device such as an LED,
- drivers for activating a mechanical or electrical device such as a motor,
- relays, and
- programmable logic controllers.

Sticker 100 may optionally include an LED or a display (not shown), which serves as a status indicator.

Generally operation code 130 of sticker 100 causes CPU 110 to transmit messages in storage 125 via wireless communicator 160 to currently nearby stickers that are within range of wireless communicator 160, to receive messages from the nearby stickers, and to store the received messages in storage 125.

If sticker 100 is an enhanced sticker, then generally operation code 130 of sticker 100 further causes CPU 110 to transmit messages in storage 120 to a network, such as the Internet, for forwarding to their respective designated destination computers, when an access point for the Internet is currently within range of wireless communicator 160; and to receive messages, originating from respective computers, via the Internet when an access point for the Internet is currently within range of wireless communicator 160.

Figure 2:
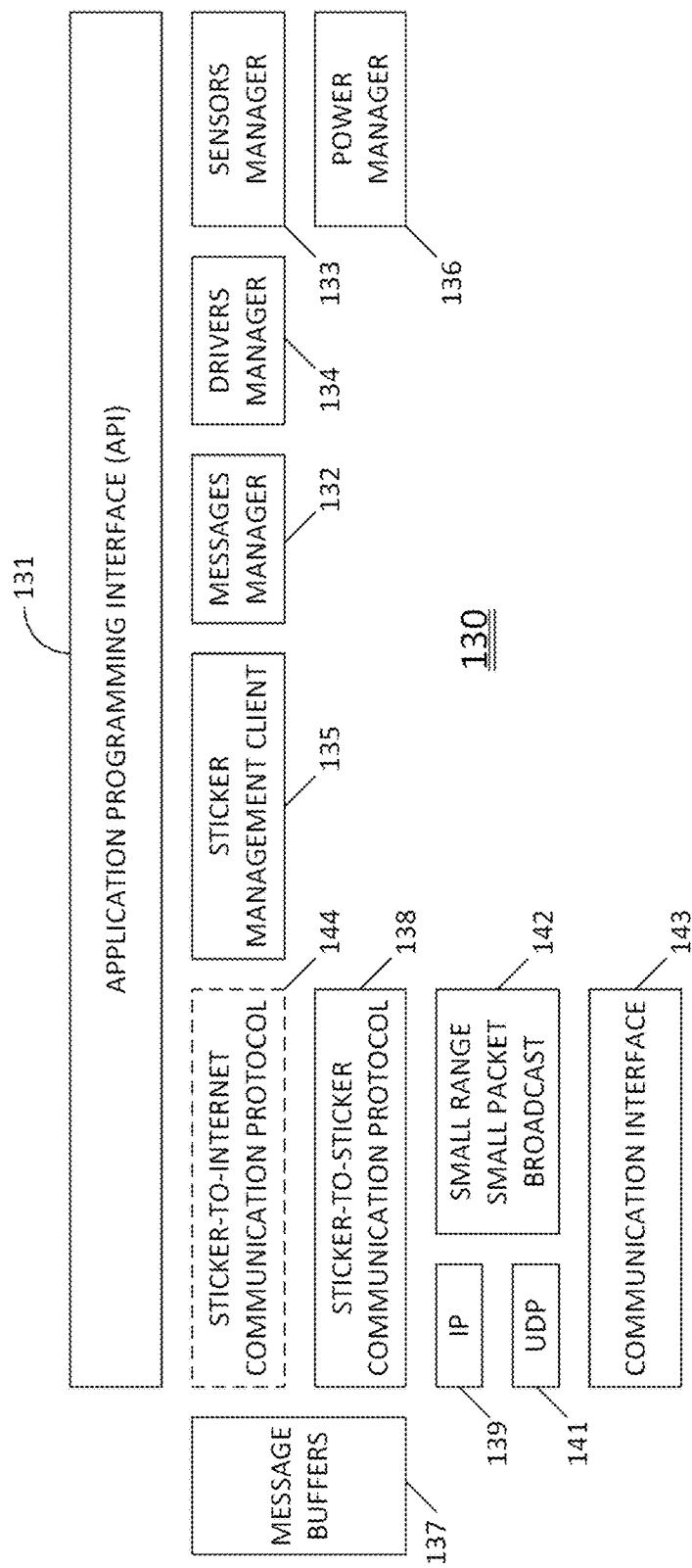
FIG. 2 is a simplified block diagram of operation code of a sticker, in accordance with an embodiment of the present invention.

Reference is made to FIG. 2, which is a simplified block diagram of operation code 130 of a sticker 100, in accordance with an embodiment of the present invention. Shown in FIG. 2 is an application programming interface (API) 131, which enables a developer to build an application that sends and receives messages between the application and sticker 100 via a messages manager 132. API 131 enables a user to extend functionality of sticker 100 by adding new/customized sensors and drivers. The user provides sticker 100 with code to read the new/customized sensor and code to operate the new/customized driver. In an exemplary usage scenario, a user adds a driver to shake a bottle of wine or medicine. This "shaking driver" is controlled by logic that operates a motor. Using API 131, the user application sends the sticker instructions to start and stop shaking the bottle. The instructions may be in the form of a code of "1" to start shaking, and a code of "0" to stop shaking, that is transmitted to a specific port attached to the sticker. API 131 enables transmission of 0 s and 1 s, and verifies whether or not the instructions were accepted. When the shaking driver is enhanced to include a spinning operation, API 131 enables updating the code of the shaking driver so that it accepts both shake and spin instructions.

Figure 12:
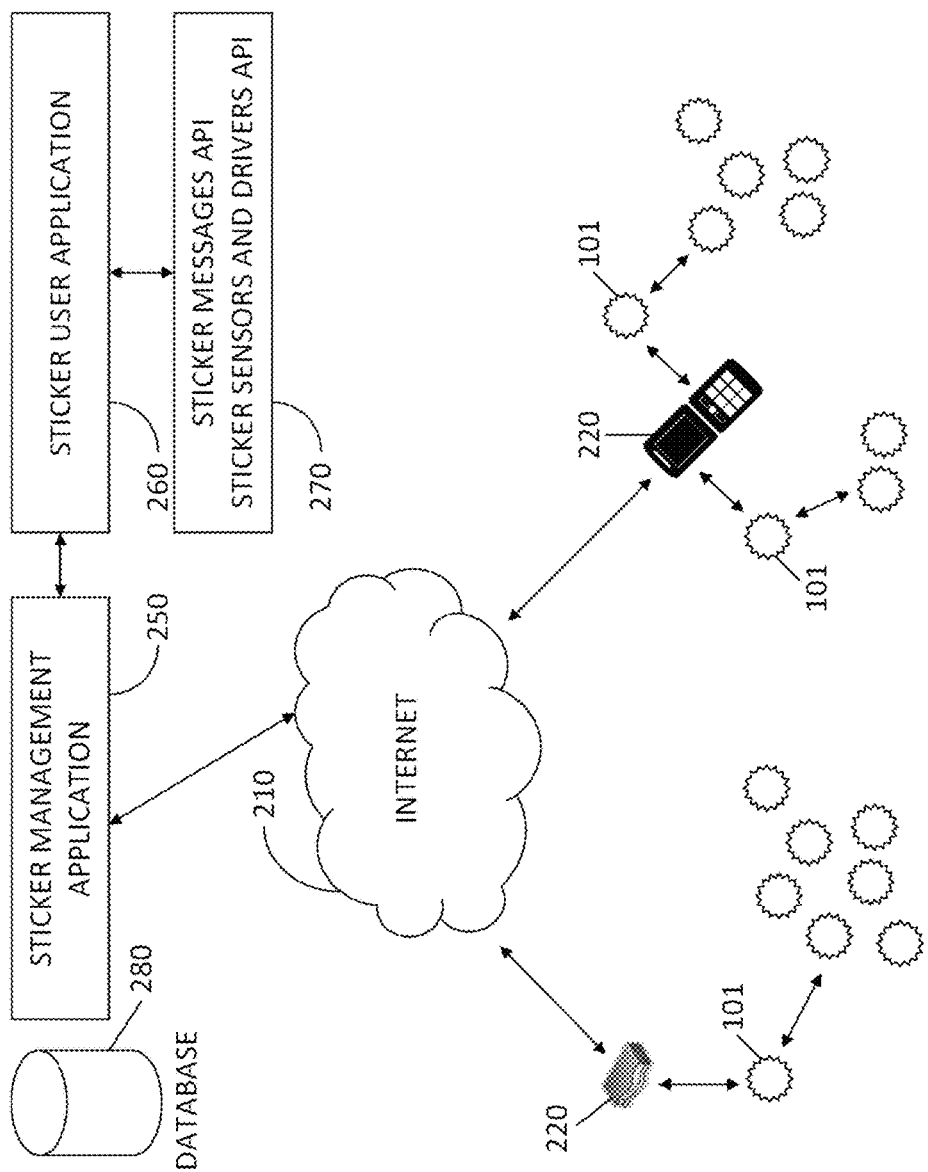
FIG. 12 is a simplified diagram of sticker management, in accordance with an embodiment of the present invention.

Generally, stickers 100 are controlled by (i) a management application (element 250 of FIG. 12), and (ii) a user application (element 260 of FIG. 12). The management application uses a sticker management client 135, and the user application uses API 131 to access sensors and drivers for reading, writing, and executing instructions via a sensors manager 133 and a drivers manager 134.

The management application is generally provided to a user along with the stickers. The management application receives alerts from stickers and from sticker networks, and generates event logs. The management application enables configuring the stickers. Sticker configuration includes inter alia:
- configuring if the stickers participate in a global public sticker network, or a private network,
- private network parameters—name of the private network, sticker name, private network authentication data,
- configuring sleep time, send and receive intervals, simultaneous vs. serial send and receive,
- updating sticker operation code 130 and adding code extensions, and
- managing the power of sticker 100 via a power manager 136.

The management application may provision code extensions to operation code 130 by transmitting sticker machine code that executes on a sticker 100. The sticker machine code is not part of the original operation code 130. The sticker machine code is additional code that is locally or remotely loaded by the management application and API 131, which enables the user to extend the operation of sticker 100 by adding functionality.

The management application may also provision driver code, which is executed by a driver coupled with sticker 100, which enables the user to add functionality to the driver.

The management application designates a policy for data messages and control messages. The policy sets priorities of messages. Generally the priorities reflect the urgencies and/or severities of the messages. In an exemplary usage scenario a policy assigns priority level 5 (highest priority) to data messages reporting temperature readings above a severely high temperature, and assigns a priority level 1 (lower priority) to data messages reporting sticker location data. The policy assigns priority level 5 to control messages with instructions to begin operating a fan, and assigns a priority level 1 to messages with instructions to set an LED light to green.

The sticker network is programmed to move messages with high priority sooner than messages with lower priority. Thus, when a sticker is within range of nearby stickers, it checks the priorities of the messages in its storage. Messages with higher priorities are transmitted before messages with lower priorities, even though the higher priority messages may have arrived after the lower priority messages arrived.

The user application defines and controls functioning of the stickers and of the stickers' sensors and drivers. In an exemplary usage case, stickers are attached to milk bottles in a warehouse. Each sticker has a temperature sensor. Each sticker has a red/green LED. Some stickers are coupled with a cooling fan driver. The user application defines events and responses. A first event may be that the milk is too warm, and the response may be to operate the fan for a designated time interval or until the temperature of the milk drops below a target value. A second event may be that the "use until" date of the milk has passed, and the response may be to turn the sticker LED light to red, and send a control message and/or an e-mail message that the milk has expired.

Operation code 130 also includes message buffers 137 and a sticker-to-sticker protocol 138. Sticker-to-sticker communication is described below with reference to FIG. 3. Operation code 130 also includes an Internet protocol (IP) module 139, a user datagram protocol (UDP) module 141, a small range small packet broadcast module 142 and a communication interface 143. Enhanced stickers 100, which also communicate via the Internet, include a sticker-to-Internet protocol 144.

Figure 3:
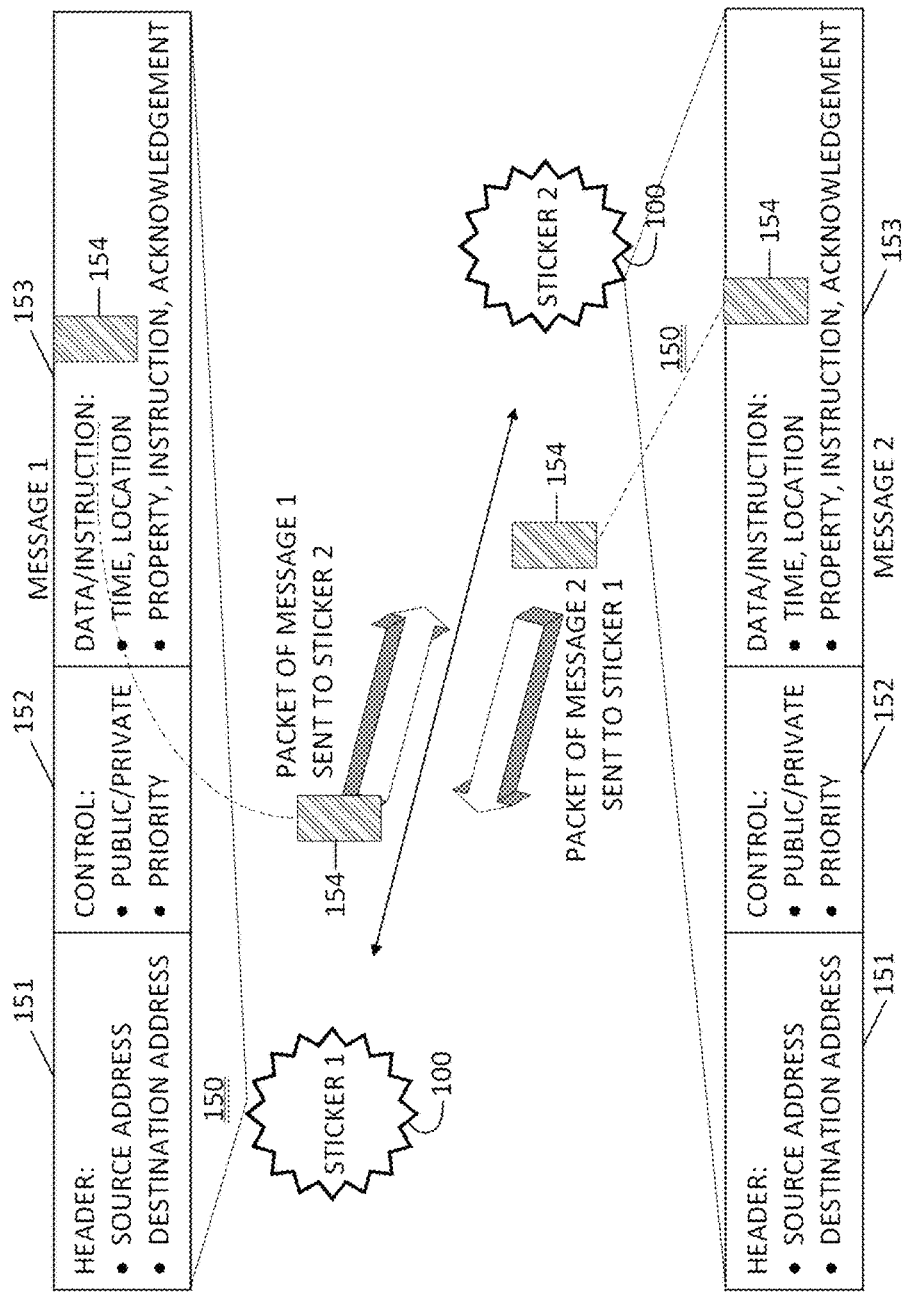
FIG. 3 is a simplified diagram of sticker-to-sticker communication, in accordance with an embodiment of the present invention.

Reference is made to FIG. 3, which is a simplified diagram of sticker-to-sticker communication, in accordance with an embodiment of the present invention. FIG. 3 shows the anatomy of a message 150. Each message 150 includes a header section 151 specifying inter alia a source address and a destination address. Generally, for data messages the source address is a sticker ID, and the destination address is an address of a computer that runs a user application. Generally, for control messages the source address is the address of a computer that runs a user application, and the destination address is an ID of a sticker.

Each message 150 includes a control section 152 designating inter alia a public vs. private network, and a priority.

Each message 150 includes a data/instructions section 153 including inter alia a time and location, current properties of the sticker and its vicinity, one or more instructions for a sticker or for a driver, and one or more acknowledgements for a sticker.

Each message 150 is divided into small packets 154, which are transmitted under control of small range small packet broadcast module 142 (FIG. 2).

FIG. 3 shows two stickers 100; namely, STICKER 1 and STICKER 2, which contain respective messages MESSAGE 1 and MESSAGE 2 in their respective storages 130. When STICKER 1 and STICKER 2 are within communication range of one another, they exchange the messages 150 stored in their respective storages 130. Messages 150 are transmitted one or more packets at a time. FIG. 3 shows a packet 154 of MESSAGE 1 being transmitted from STICKER 1 to STICKER 2, and a packet 154 of MESSAGE 2 being transmitted from STICKER 2 to STICKER 1. It will be appreciate by those skilled in the art that after a sufficient amount of time exchanging packets 154, STICKER 1 and STICKER 2 will each contain the original messages 150 of both stickers.

After each packet of a message is successfully received, the receiving sticker sends an acknowledgement to the transmitting sticker. If the transmitting sticker does not receive an acknowledgement within a designated time period, then it re-transmits the same packet. If the transmitting sticker receives an acknowledgement, then it transmits the next packet of the message to the receiving sticker, until all of the message packets have been acknowledged.

Figure 4:
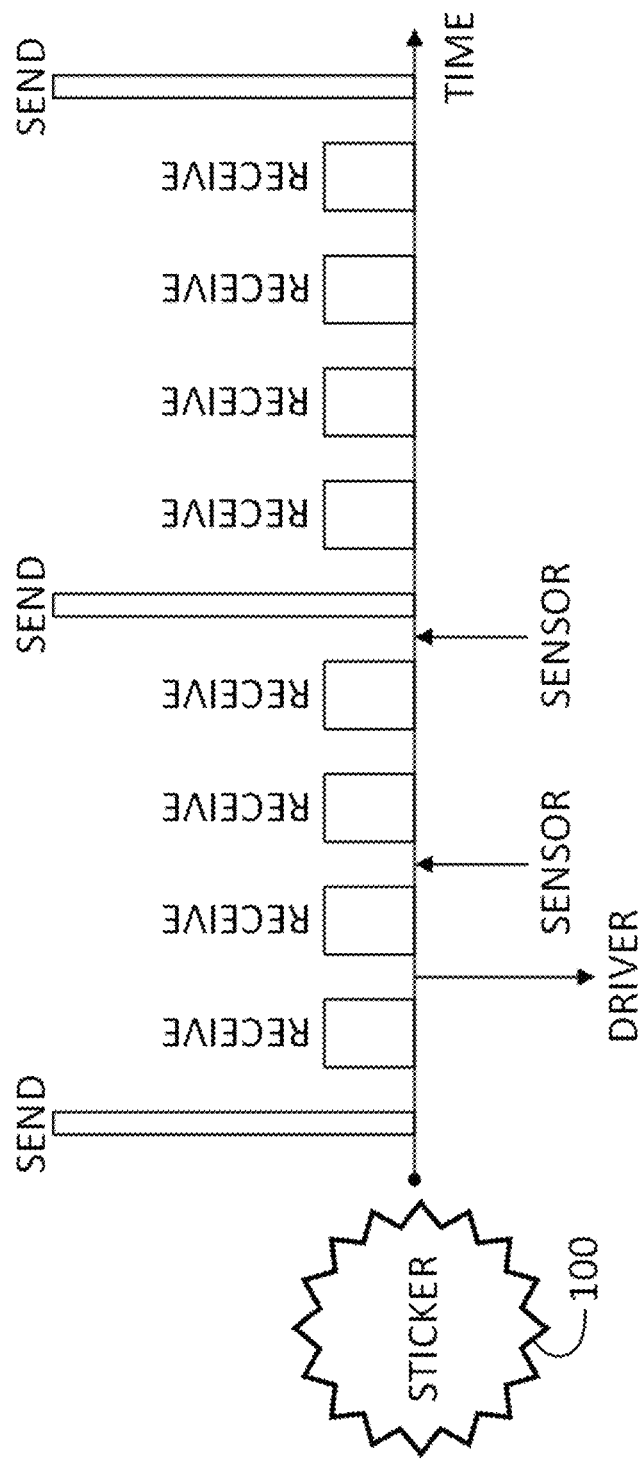
FIG. 4 is a simplified timeline of sticker activity showing regular activity levels, in accordance with an embodiment of the present invention.

Reference is made to FIG. 4, which is a simplified timeline of sticker activity showing regular activity levels, in accordance with an embodiment of the present invention. The timeline includes time intervals for sending messages, and time intervals for receiving messages. The timeline includes times at which sensors are accessed, designated by incoming arrows, and times at which drivers are accessed, indicated by outgoing arrows, by sticker interfaces 190 (FIG. 1).

The send and receive time intervals in FIG. 4 and the sensor and driver interfacing times are set by the management application. The times set by the management application may be self-adaptable by sticker 100, based on proximity of other stickers, priorities of messages, and battery level. Since the send and receive time intervals are repetitive, the likelihood is high that sticker 100 will successfully exchange messages with other stickers that are nearby within range of its wireless communicator 160, as described above with reference to FIG. 3.

During the time that sticker 100 is not occupied with message exchange and with sensor/driver communication, sticker 100 performs computations as necessary, and communicates with its management and/or user application. If an instruction or communication priority is currently high, sticker 100 assigns priority to that instruction or communication, as per the policy designated by the management application.

Figure 5:
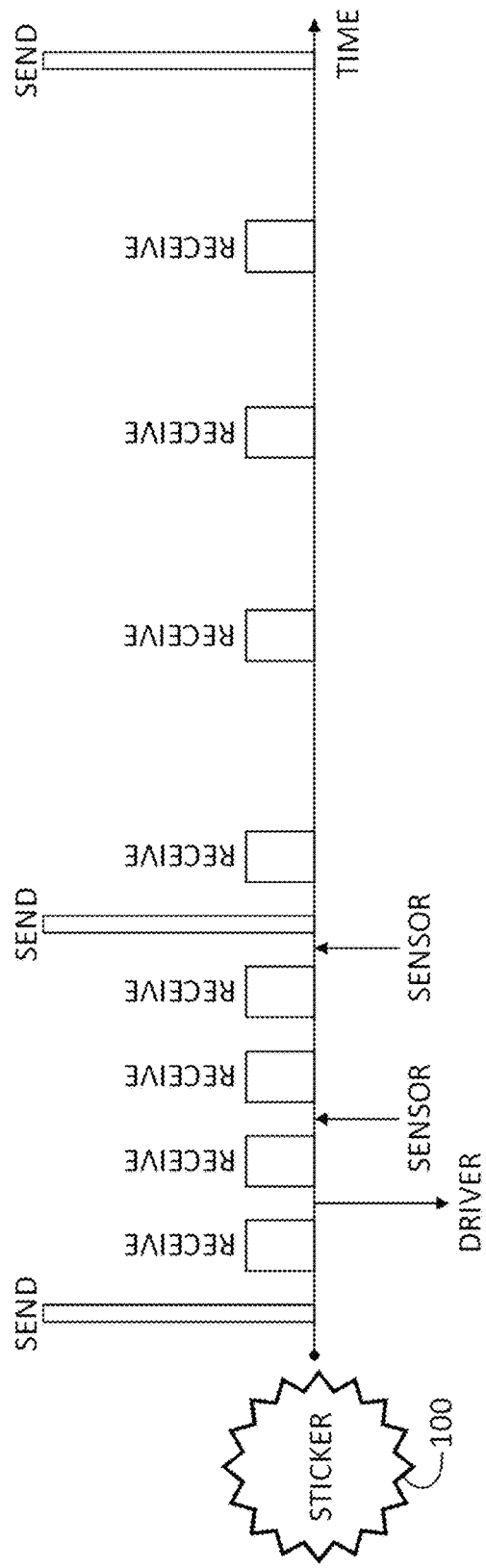
FIG. 5 is a simplified timeline of sticker activity showing high and low activity levels, in accordance with an embodiment of the present invention.

Reference is made to FIG. 5, which is a simplified timeline of sticker activity showing high and low activity levels, in accordance with an embodiment of the present invention. The left side of the timeline shows activity of a sticker when other stickers are nearby, or when the sticker has high priority messages in its storage. The right side of the timeline shows activity of the sticker when other stickers are not nearby, and when the sticker has only low priority messages in its storage.

Figure 6:
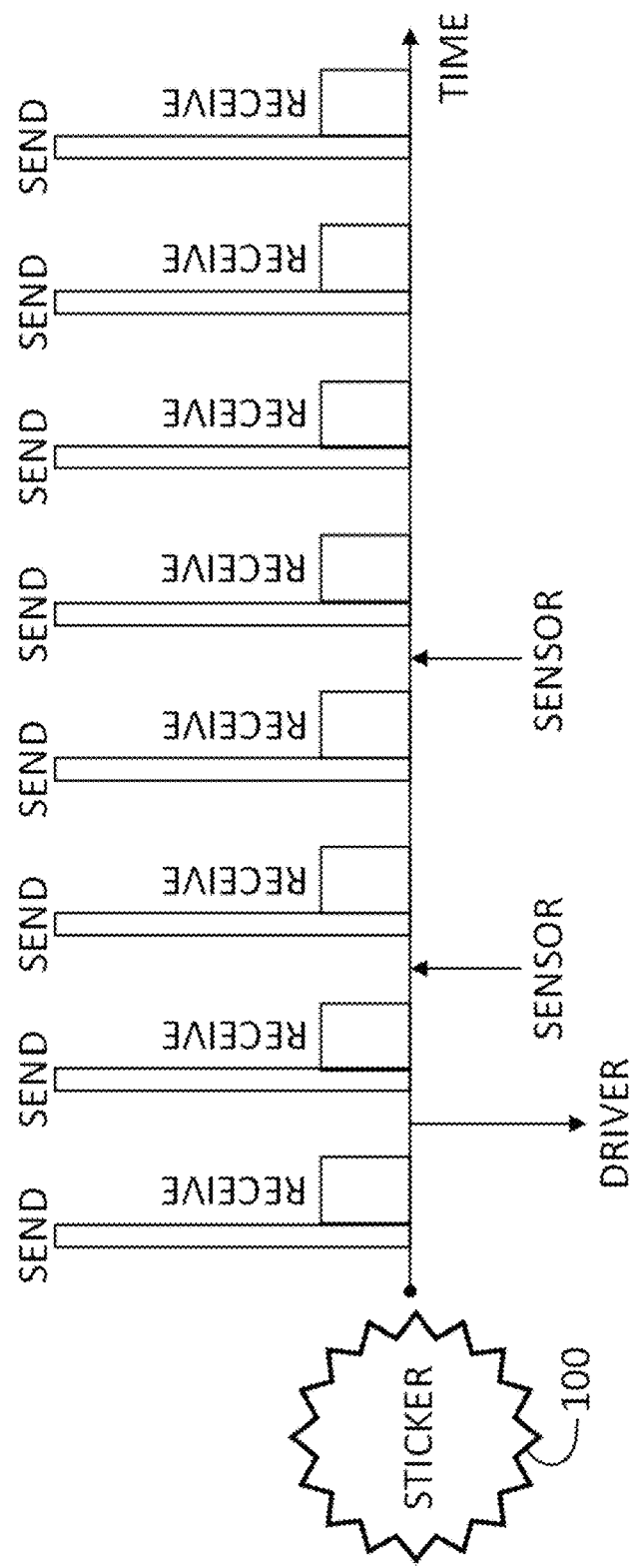
FIG. 6 is a simplified timeline of sticker activity showing simultaneous send and receives, in accordance with an embodiment of the present invention.

Reference is made to FIG. 6, which is a simplified timeline of sticker activity showing simultaneous send and receive, in accordance with an embodiment of the present invention. The timeline shows full duplex send and receive activity. In order for a sticker to be able to operate in full duplex mode, the sticker is equipped with two transmitter/receiver units; namely, one unit that receives data and another unit that simultaneously sends data.

Figure 7:
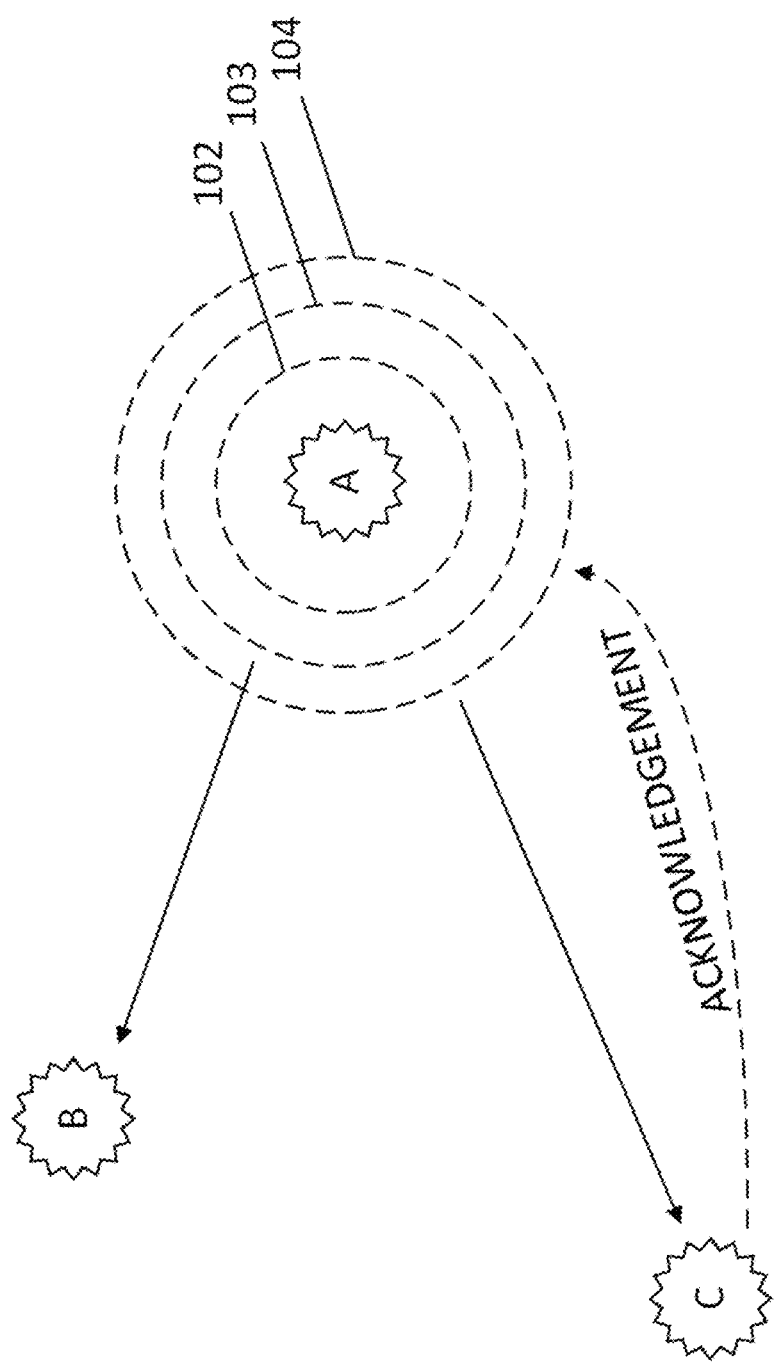
FIG. 7 is a simplified diagram of low power sticker-to-sticker communication, in accordance with an embodiment of the present invention.

Reference is made to FIG. 7, which is a simplified diagram of low power sticker-to-sticker communication, in accordance with an embodiment of the present invention. FIG. 7 shows sticker A with three concentric ranges of communication 102, 103 and 104. Each successive range requires a larger power level than the range within it, albeit the different power levels are all small levels of power; i.e., range 102 corresponds to the lowest of the low power levels, range 103 corresponds to the middle of the low power levels, and range 104 corresponds to the highest of the low power levels. Sticker B is within range 103 of sticker A, and sticker C is within range 104 of sticker A.

In the embodiment of the present invention shown in FIG. 7, each sticker is programmed to use a successively higher power level if it fails to identify other stickers within its range at its current power level, until it reaches the highest of its power levels. The programmed instructions are defined in the sticker's management policy or programmed into the sticker, and generally are dependent upon an interval of time during which the sticker is not in communication with other stickers, the sticker's current power level, and priorities of the sticker's stored messages.

Figure 8:
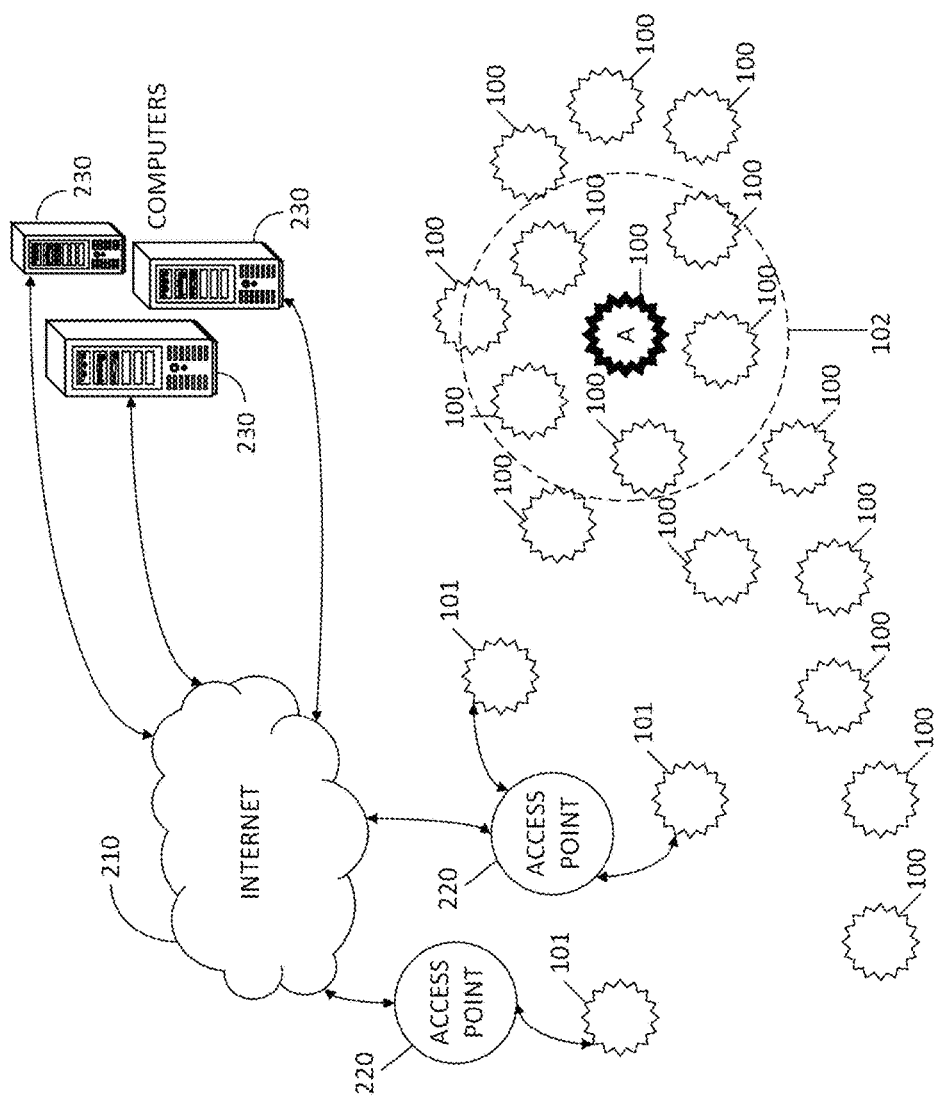
FIG. 8 is a simplified block diagram of a communication system for a network of stickers, in accordance with an embodiment of the present invention.

Reference is made to FIG. 8, which is a simplified block diagram of a communication system for a network of stickers, in accordance with an embodiment of the present invention. FIG. 8 shows a sticker-to-sticker network including stickers 100 and enhanced stickers 101. A dashed circle 102 around one of the stickers, shown in bold and designated A, shows the range of its wireless communicator 160. Stickers 100 located within circle 102 exchange messages with sticker A, as described above with reference to FIG. 3.

FIG. 8 shows the Internet 210, Internet access points 220 and computers 230. Computers 230 are destination computers for data messages, and may be source computers for control messages. When an Internet access point 220 is within communication range of a sticker 101, sticker 101 transmits data messages in its storage 120 via Internet 210 to their respective destination computers 230, and receives control messages addressed to stickers, from source computers 230 via Internet 210. Internet access point 220 may be inter alia at least one of:
- a router,
- a proxy,
- a gateway, and
- a cellphone/smartphone.

Figure 9:
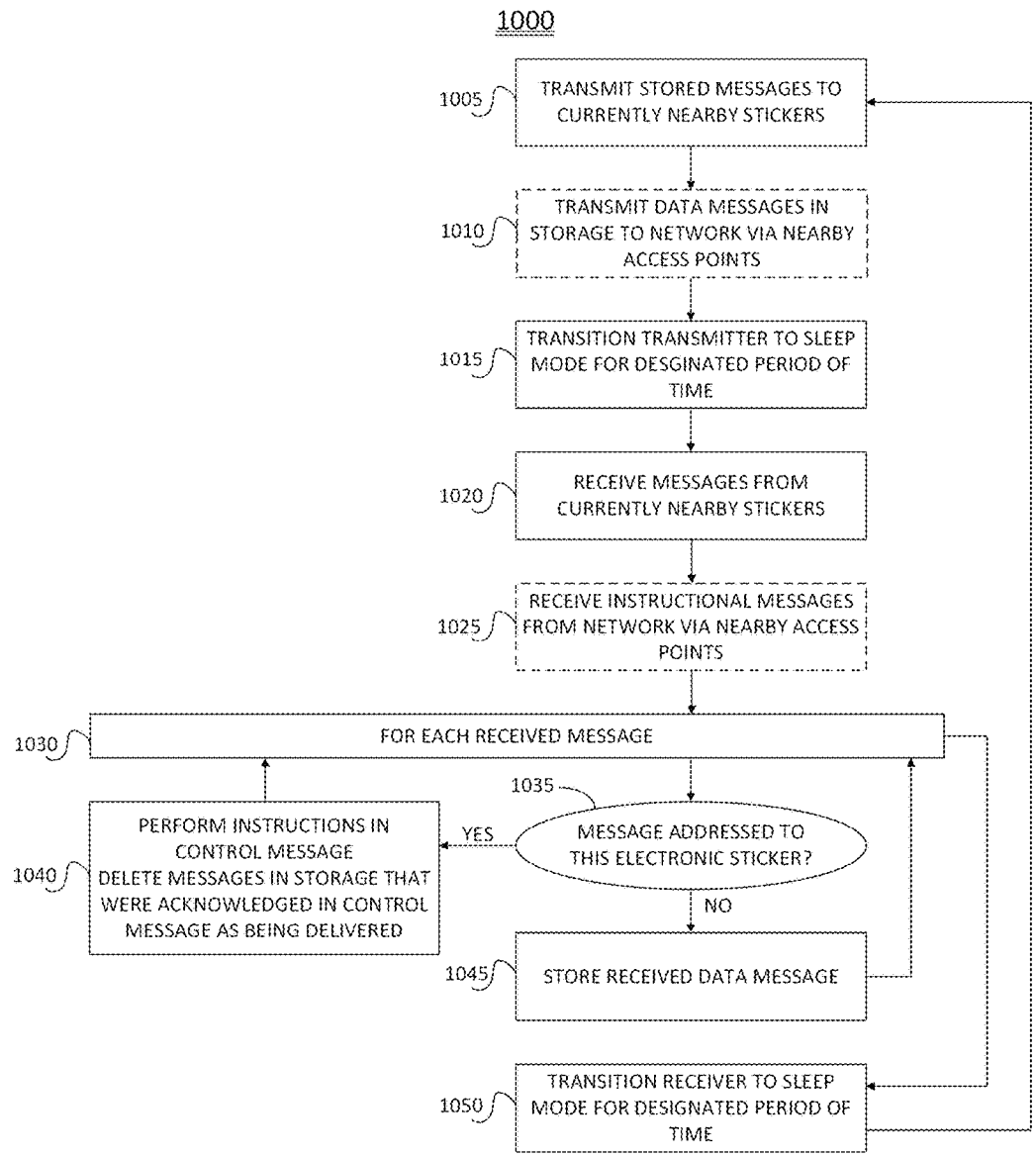
FIG. 9 is a simplified flowchart of a communication method for stickers, in accordance with an embodiment of the present invention.

Reference is made to FIG. 9, which is a simplified flowchart of a communication method 1000 for stickers 100, in accordance with an embodiment of the present invention. Each sticker 100 performs the operations of method 1000, with the exception of operations 1010 and 1025 which are performed by enhanced stickers.

At operation 1005 the sticker's wireless communicator 160 transmits messages stored in the sticker's storage 125 to other stickers that are currently nearby to sticker 100, within range of its wireless communicator 160. If sticker 100 is an enhanced sticker and if an Internet access point is currently within range of its wireless communicator 160, then at operation 1010 the sticker's wireless communicator 160 transmits data messages stored in the sticker's storage 125 to the Internet, for delivery to their destination computers 230, via the Internet access point.

After transmission of messages at operations 1005 and, for an enhanced sticker, at operation 1010, the transmitter of wireless communicator 160 transitions to sleep mode for a first designated period of time, in order to conserve power, at operation 1015. The first designated period of time may be configured during installation of sticker 100, and/or may be set/changed by the management application and/or the user application that control operation of sticker 100.

At operation 1020 sticker 100 receives messages from the other stickers that are within range of wireless communicator 160. If sticker 100 is an enhanced sticker, and if an Internet access point is currently within range of its wireless communicator 160, then at operation 1025 the sticker's wireless communicator 160 receives control messages for destination stickers, via the Internet access point.

Sticker 100 performs a loop 1030 over each message it received at operation 1020 and, for an enhanced sticker, at operation 1025. At operation 1035 sticker 100 determines if the received message is addressed to sticker 100; i.e., if the destination address of the message is the address of sticker 100. If the determination at operation 1035 is affirmative, then the received message is a control message including an instruction and/or an acknowledgement for sticker 100. At operation 1040 sticker 100 performs the instruction in the message, if the message includes an instruction. If the message includes an acknowledgement, then sticker 100 deletes the message(s) in its storage 125 for which successful delivery is acknowledged. Processing then returns to loop 1030.

If the determination at operation 1035 is not affirmative, then at operation 1045 sticker 100 stores the received message in its storage 125. Processing then returns to loop 1030.

After completion of loop 1030, processing advances to operation 1050, at which the receiver of wireless communicator 160 transitions to sleep mode for a second designated period of time, in order to conserve power. The second designated period of time may be configured during installation of sticker 100, and/or may be set/changed by the management and/or the user application that control operation of sticker 100. After operation 1050 processing returns to operation 1005.

Figure 10:
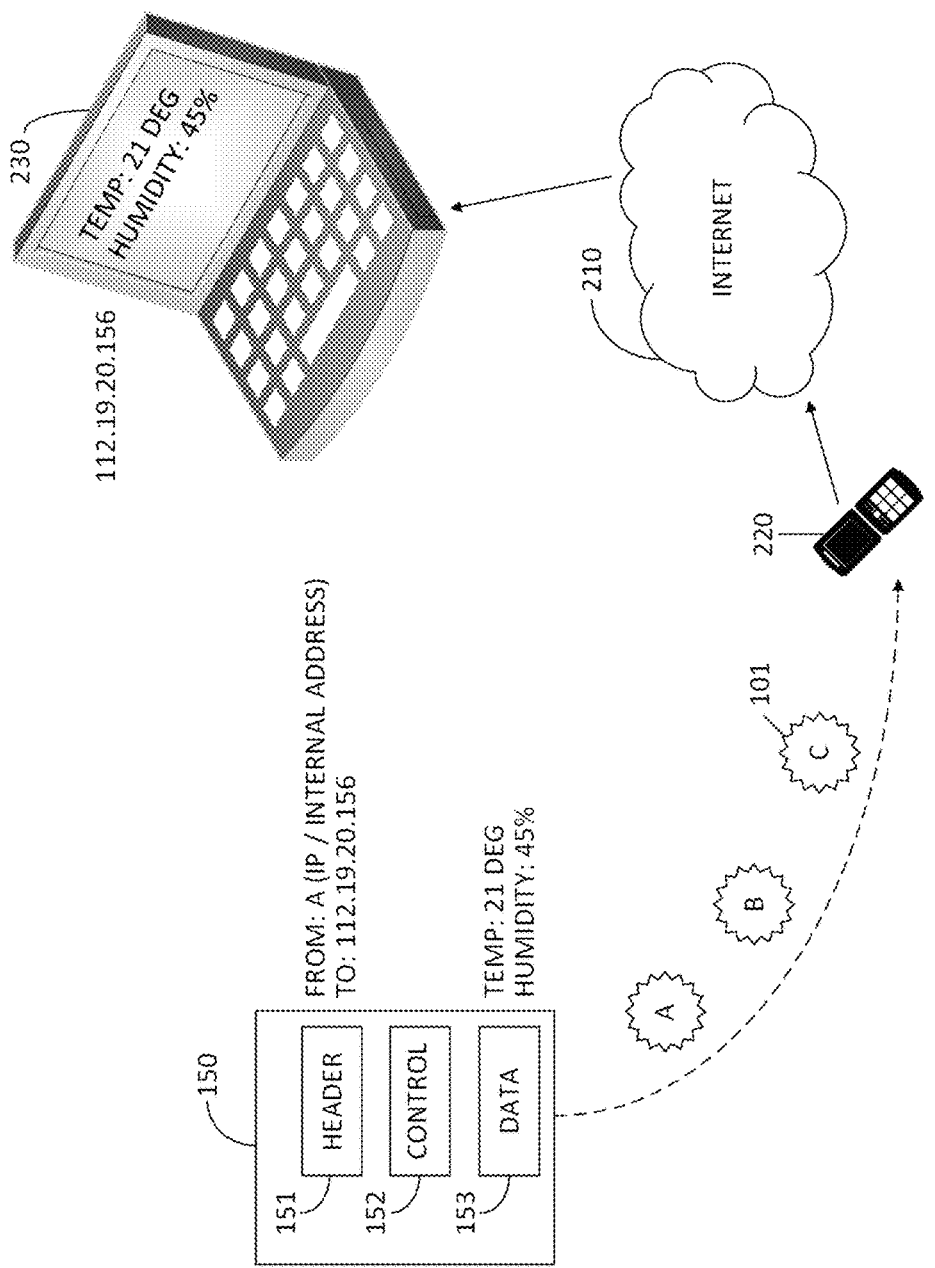
FIG. 10 is a simplified diagram of delivering a message via a network of stickers, in accordance with an embodiment of the present invention.

Reference is made to FIG. 10, which is a simplified diagram of delivering a message 150 via a network of stickers, in accordance with an embodiment of the present invention. FIG. 10 shows data message 150 with header section 151 indicating that the message is being sent from a source ID of sticker A to a destination computer having IP address 112.19.20.156. The ID of sticker A may be an IP address or an internal sticker network address. Control section 152 is empty, although for control messages, control section may include instructions; e.g., PRIORITY: MEDIUM, USE PUBLIC STICKER NETWORK. Data section 153 includes a temperature reading of 21 deg. and a humidity reading of 45%. This data represents the temperature and humidity in the current vicinity of sticker A.

Sticker A transmits message 150 to sticker B, when sticker B is within transmission range of sticker A. In turn, sticker B transmits message 150 to sticker C, when sticker C is within transmission range of sticker B. Sticker C is an enhanced sticker. As such, when Internet access point, such as cellphone 220, is within range of sticker C, then sticker C transmits message 150 to its destination computer 230 via Internet 210. FIG. 10 shows destination computer 230 successfully receiving message 150 and displaying the data content of the message. In turn, destination computer sends a control message to sticker C via Internet 210 acknowledging successful receipt of message 150, and possibly also an instruction based on the sticker's temperature and humidity readings.

Figure 11:
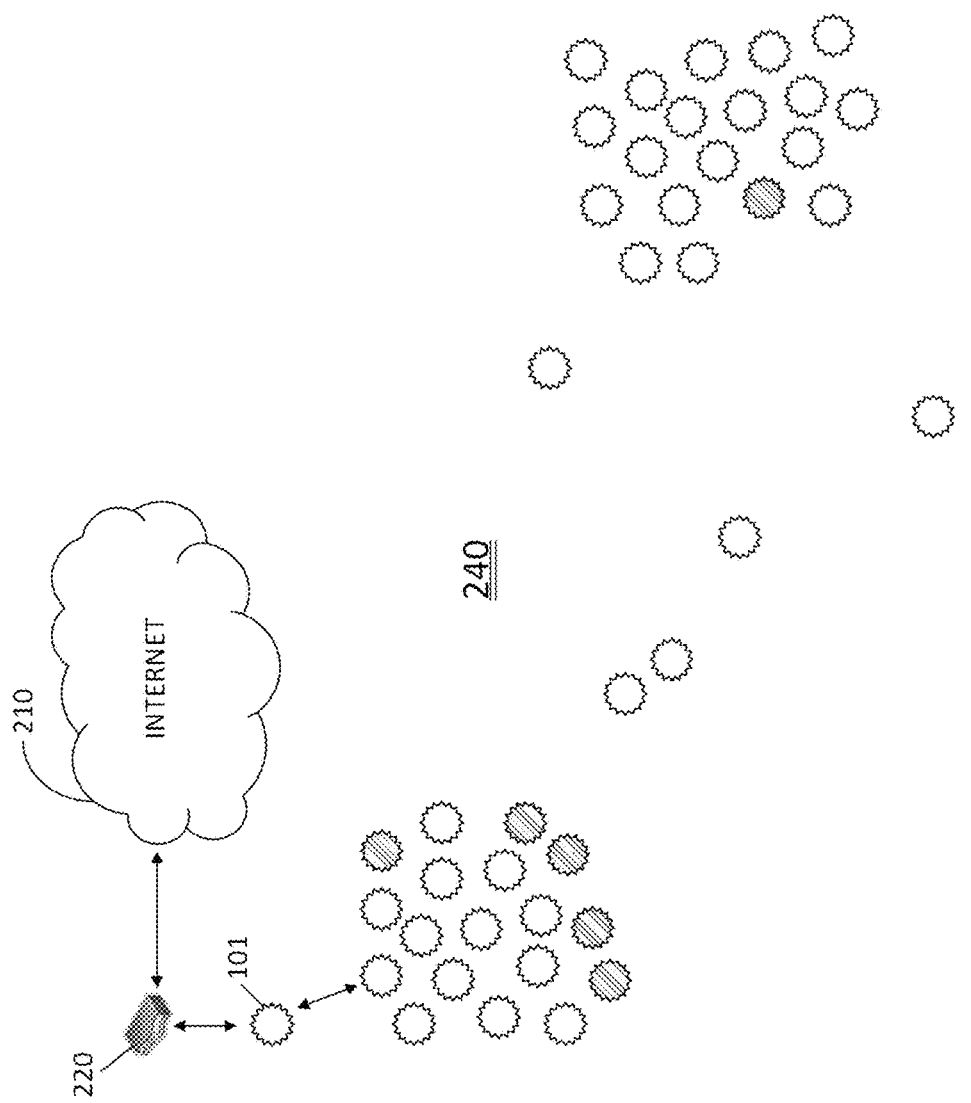
FIG. 11 is a simplified diagram of a world-wide network of stickers, in accordance with an embodiment of the present invention.

Reference is made to FIG. 11, which is a simplified diagram of a world-wide network 240 of stickers, in accordance with an embodiment of the present invention. FIG. 11 shows a plurality of stickers distributed in different geographical locations, an enhanced sticker 101, Internet 210 and an Internet access point 220, depicted as a router. When Internet access point 220 is within communication range of enhanced sticker 101, sticker 101 transmits its stored data messages to their destinations via Internet 210, and receives control messages from source computers via Internet 210. As shown in FIG. 11, many stickers may temporarily have no access to Internet 210.

Users may decide to join world-wide sticker network 240, or alternatively to use a private sticker network of their own. Stickers depicted in FIG. 9 with cross-hatching belong to a specific user, ABC Co. ABC Co. may use world-wide network 240, in which case each of ABC Co.'s stickers communicates with other stickers not belonging to ABC Co., but the data in its data messages is not exposed to the other stickers. Alternatively, ABC Co. may use its own private network of stickers.

Reference is made to FIG. 12, which is a simplified diagram of sticker management, in accordance with an embodiment of the present invention. FIG. 12 shows a sticker management application 250, a sticker user application 260, APIs 270 for sticker messages, sticker sensors and sticker drivers, and a database 280. Sticker management application 250 manages sticker-to-sticker world-wide network 240. Sticker user application 260 is, e.g., ABC Co.'s application for its stickers, which uses APIs 270 to control its stickers. APIs 270 operate in conjunction with APIs 131 (FIG. 2). APIs 270 enable user application 260 to add new properties, new sensors and new drivers. User application 260 controls data messages that the stickers generate, and control messages that send acknowledgements of received data messages, and that send instructions relating to the stickers' sensors and drivers, and internal configurations. Exemplary user application 260 operations are:
- read sensor S from sticker A, send command C to driver D attached to sticker A, and set sticker A in power saving mode, inter alia by changing its sleep time period and/or its send and receive time intervals.

Database 280 stores inter alia messages, event logs, error logs and policies.

Figure 13:
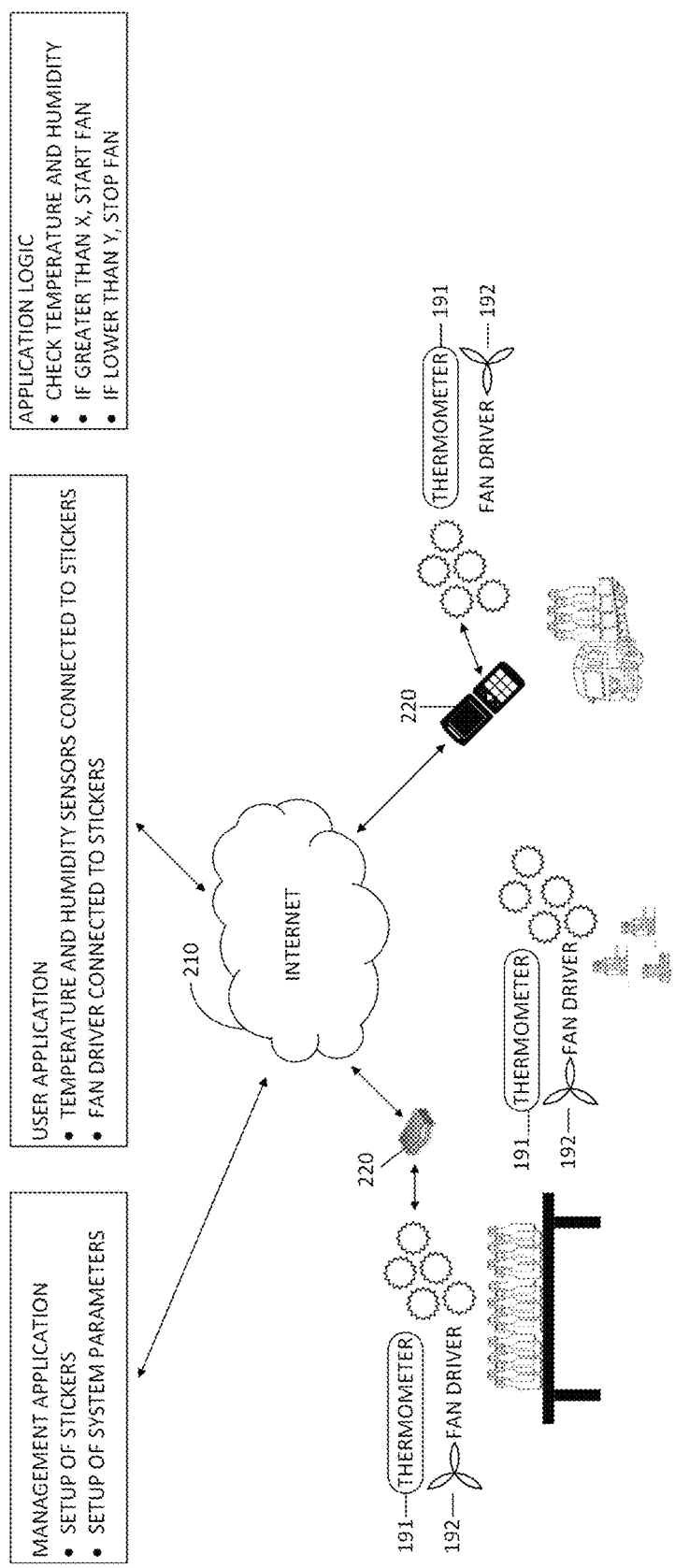
FIG. 13 is a simplified diagram of an exemplary sticker network application, in accordance with an embodiment of the present invention.

Reference is made to FIG. 13, which is a simplified diagram of an exemplary sticker network application, in accordance with an embodiment of the present invention. On the bottom right of FIG. 13 is shown a truck delivering bottles of medicine. Some or all of the medicine bottles have stickers attached thereto, at least one of is an enhanced sticker. The stickers include sensors, specifically a thermometer 191. The stickers have drivers 192 to operate a cooling fan. If a cellphone 220 is present in the delivery truck, then the stickers in the delivery truck use cellphone 220, via the enhanced sticker(s) in the truck, to transmit data messages to user application 260 (FIG. 10) and to receive control messages from user application 260 via Internet 210.

On the bottom left of FIG. 13 is shown a shelf in a pharmacy stocking the medicine bottles received from the delivery truck. If a local router, such as a WiFi router 220, is present in the pharmacy, then the stickers on the shelf use router 220, via the enhanced sticker(s) on the shelf, to transmit data messages to user application 260 and to receive control messages from user application 260 via Internet 210.

As such, user application 260 receives temperature information from the stickers, to ascertain the temperature in the bottles' current vicinity. The stickers may include additional sensors, such as a humidity sensor, in which case user application 260 also ascertains the humidity in the current vicinity of the bottles; and a location sensor, in which case user application 260 also ascertains the current location of the bottles.

Based on the temperature and humidity in the current vicinity of the stickers, user application 260 may control the stickers to operate a fan coupled to the stickers via interface 190 (FIG. 1). E.g., logic of user application 260 may instruct the stickers to start the fan if the temperature/humidity in their vicinity is greater than a first threshold X, and to stop the fan if the temperature/humidity in their vicinity is lower than a second threshold Y.

User application 260 may generate a feedback loop for an air conditioner by instructing a driver to lower the air conditioner temperature when a sensor indicates that temperature of the bottles rose above a target temperature, and to raise the air conditioner temperature when a sensor indicates that temperature of the bottles fell below the target temperature.

The stickers shown in the bottom middle of FIG. 13 are currently in a location where there is no Internet access.

Multiple users may share the same sticker network. The delivery truck in FIG. 13 may deliver bottles of multiple companies simultaneously, and the pharmacy may stock bottles of the multiple companies simultaneously. Router 220 and cellphone 220 act as Internet access points for the multiple companies. Thus, stickers of ABC Co. communicate only with ABC Co.'s user application 260.

Figure 14:
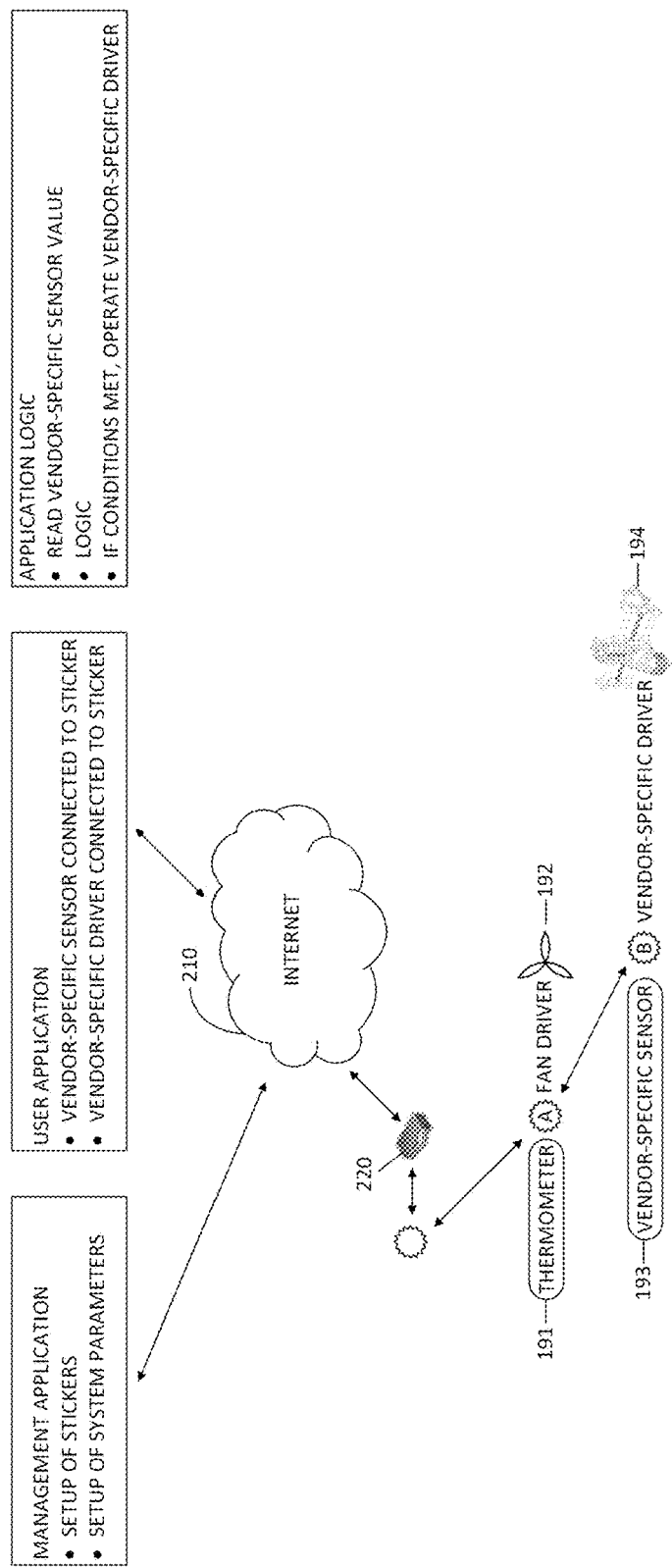
FIG. 14 is a simplified diagram of an exemplary sticker network application with vendor-specific sensors and drivers, in accordance with an embodiment of the present invention.

Reference is made to FIG. 14, which is a simplified diagram of an exemplary sticker network application with vendor-specific sensors and drivers, in accordance with an embodiment of the present invention. FIG. 14 shows a generic sticker A with a temperature sensor 191 and a fan driver 192. FIG. 14 also shows a vendor-specific sticker B having a vendor-specific sensor 193 and a vendor-specific driver 194. The vendor user application includes instruction for reading vendor-specific sensor 193, performing logic based on the sensor reading and, if specific conditions are met, then activating sensor-specific driver 194. It will be appreciated by those skilled in the art that use of vendor-specific sensors and drivers enables a vendor to customize control of its stickers.

Figure 15:
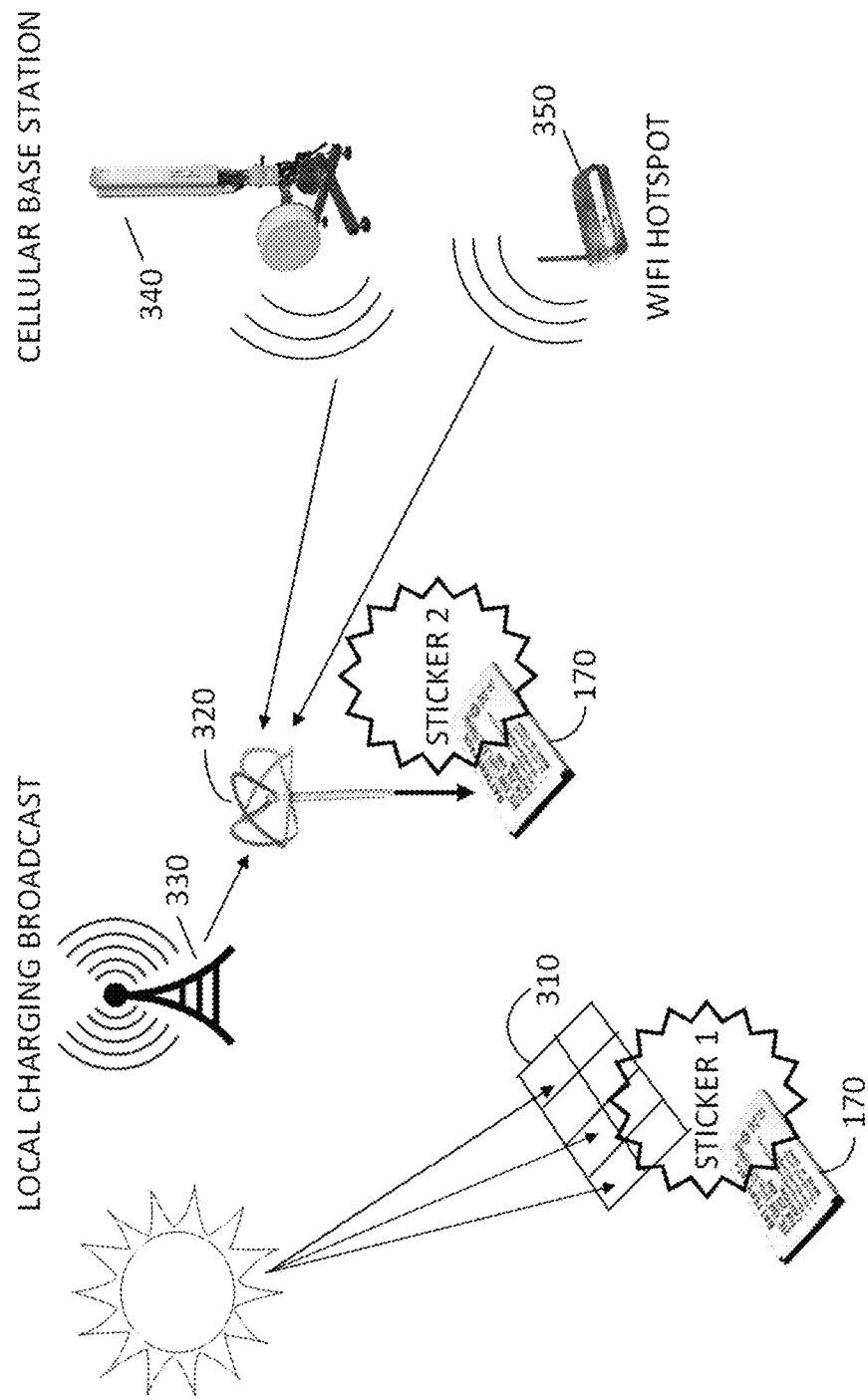
FIG. 15 is a simplified diagram of remote charging of stickers, in accordance with an embodiment of the present invention.

Reference is made to FIG. 15, which is a simplified diagram of remote charging of stickers, in accordance with an embodiment of the present invention. FIG. 15 shows two stickers 100, STICKER 1 and STICKER 2, each with a power source 170 that includes a rechargeable battery. Remote charging extends the operating time of stickers 100. FIG. 15 shows two general options for remote charging; namely, by solar energy and by converting radio frequency (RF) waves to power.

STICKER 1 includes a micro solar panel 310 on its surface. STICKER 1 intercepts sun energy and charges battery 170 by converting sun energy to power when the sunlight enters solar pane 310.

STICKER 2 includes a micro reception antenna 320, a convertor that converts RF waves to power, and a charger that connects to battery 170 via a regulator. As such, when STICKER 2 is located near local charging broadcast 330 then, while local charging broadcast 330 is transmitting, the energy of the transmitted RF waves is used to charge battery 170 of STICKER 2. More generally, local charging broadcast 330 broadcasts an RF signal to all stickers in its vicinity, and the batteries of those stickers are all charged.

Alternatively or additionally, a cellular base station 340 and/or a Wifi hotspot 350 may be used to recharge battery 170 of STICKER 2. Generally, Cellular base station and Wifi hotspot 350 are always transmitting RF waves. Upon reception by antenna 320 these RF waves are converted to power for battery 170.

Reference is made to FIG. 16, which is a simplified diagram of a protocol for stickers and other geographically distributed Internet of Things (IoT) devices, in accordance with an embodiment of the present invention. FIG. 16 shows an Internet access point, namely, WiFi router 220. A first portion of the traffic on router 220 is dedicated to a conventional private secured network. A second portion of the traffic on router 220 is dedicated to a convention guest secured network. A third portion of the traffic on router 220 is dedicated to stickers, or to other geographically distributed IoT devices.

FIG. 16 shows a pie chart for router 220, designating 64% of its traffic for a private network, 25% of its traffic for a guest network, and 11% of its traffic for the sticker/IoT network. The third portion of the traffic is non-conventional traffic for a router, and is effectively a donation for the benefit of the sticker/IoT network. As such, enhanced stickers are able to transmit data messages via the Internet and receive control messages via the Internet, by using the donated portions of routers and other Internet access points.

It will thus be appreciated that embodiments of the subject invention enable a world-wide network and a private network of stickers that implement protocols of sticker-to-sticker and sticker-to-Internet communication. Embodiments of the subject invention enable efficient quality control, including environmental and defect control, for items of goods that are moved about. These embodiments make it possible advantageously (i) to avoid spoilage of goods due to environmental conditions, (ii) to recall before use items of goods that are defective, (iii) to identify shortcoming in the ways goods are transported and delivered, (iv) to manage inventory, and (v) to implement vendor-specific functions, such as reading vendor-specific parameters, and activating vendor-specific drivers in response to the parameter readings.

It will further be appreciated that the subject invention has widespread application to communication with and among inexpensive, possible disposable, IoT devices whose locations are geographically distributed.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A sticker attached to an item of goods that is being transported, comprising:
   a processor;
   a non-transitory storage communicatively coupled with said processor, storing a unique address for the sticker, storing operation code for said processor, and storing a plurality of data messages, wherein data messages include an address of a source sticker, an address of a destination computer and data relating to current specific properties of the goods to which the source sticker is attached;
   a wireless communicator communicatively coupled with said processor, wirelessly transmitting and receiving data messages;
   a power source supplying power to said processor, said storage and said wireless communicator; and
   one or more interfaces to sensors that sense specific properties of the goods to which the stickers are attached;
   wherein the sticker is in transit from an origin to a destination such that the spatial relationship between the sticker and other stickers is changing, and
   the protocol for message communication between the sticker and other stickers is a redundant non-routing protocol without awareness of locations of other stickers, and with sporadic data message exchange, whereby the operation code includes instructions causing said processor to sporadically transmit data messages stored in said storage via said wireless communicator to be received by all other stickers that happen to be currently nearby, within range of said wireless communicator, to sporadically receive data messages from all of the currently nearby stickers, and to store the received data messages in said storage.

2. The sticker of claim 1 further comprising an internal clock providing a current time, and wherein data messages further include the current time.

3. The sticker of claim 1 further comprising a location identifier providing a current location of the sticker, and wherein data messages further include the current location of the sticker.

4. The sticker of claim 1 wherein the operation code further includes instructions causing said processor to transmit data messages stored in said storage to a network, for forwarding to their respective designated destination computers, when an access point for the network is currently within range of said wireless communicator, and to receive control messages, originating from respective computers, via the network when an access point for the network is currently within range of said wireless communicator, wherein a control message includes an address of a source computer, an address of a destination sticker, and an instruction or an acknowledgement for the destination sticker.

5. The sticker of claim 4, further comprising a display responding to instructions within control messages addressed to the sticker that are received by the sticker.

6. The sticker of claim 4, further comprising an interface to a driver that controls a display via instructions within control messages addressed to the sticker that are received by the sticker.

7. The sticker of claim 4 wherein the access point for the network currently within range of said wireless communicator comprises at least one of a router, a gateway, a proxy and a smartphone currently within range of said wireless communicator.

8. The sticker of claim 1 wherein the sensors comprise a scale for measuring weight.

9. The sticker of claim 1 wherein the specific properties of the goods include at least one of: weight of the item of goods to which the sticker is attached, and an indicator of whether or not the item of goods was opened.

10. The sticker of claim 1 wherein said wireless communicator comprises one or more of: a Wi-Fi communicator, a cellular communicator, an infra-red communicator, a Bluetooth communicator, a Zigbee communicator, a Z-wave communicator, a wireless USB communicator, a radio frequency communicator, an infra-red communicator, a near-field communicator, a low power wide area network (LP-WAN) communicator, a LoRaWAN communicator, a highway addressable remote transducer (HART) communicator, an EnOcean communicator, a worldwide interoperability for microwave access (WiMAX) communicator and a cellular communicator.

11. The sticker of claim 1 wherein said power source comprises one or more of: a solar power source, an RF power source, a magnetic power source and a battery.

12. A communication system for stickers, comprising a plurality of stickers, each sticker being attached to an item of goods that is being transported from a respective origin to a respective destination, each sticker comprising:
   a processor;
   an internal clock providing a current time;
   a location identifier providing a current location;
   a non-transitory storage communicatively coupled with said processor, storing a unique address for the sticker, storing operation code for said processor, and storing a plurality of data messages, wherein a data message includes an address of a source sticker, an address of a destination computer, a current time, a current location, and data relating to current specific properties of the item of goods to which the source sticker is attached;
   a wireless communicator for wirelessly transmitting and receiving data messages;
   a power source supplying power to said processor, said storage and said wireless communicator; and
   one or more interfaces to sensors that sense specific properties of the goods to which the stickers are attached;
   wherein the stickers are in transit from respective origins to respective destinations such that the spatial relationship between the stickers is changing, and
   wherein the protocol for message communication is a redundant non-routing protocol without awareness of locations of stickers, and with sporadic data message exchange, whereby
   wherein the operation codes of the stickers cause the processors of the stickers:
   to sporadically transmit data messages stored within the stickers' storages to be received by whatever other stickers are currently nearby, within range of the stickers' wireless communicators;

to sporadically receive data messages stored within storages of the other stickers that are currently nearby to the stickers, within range of the stickers' wireless communicators;

to store data messages received from nearby stickers within the stickers' storages; and to further transmit, by a subset of the stickers, data messages stored in the stickers' storages to the data messages' respective designated destination computers via a network, when there are access points to the network currently nearby the stickers, within range of the stickers' wireless communicators.

13. The system of claim 12 wherein the operation codes of the stickers further cause the processor of the stickers:

to receive, by the subset of the stickers, control messages from respective computers via the network, when there are access points for the network currently nearby the stickers, within range of the stickers' wireless communicators, wherein a control message includes an address of a source computer, an address of a destination sticker, and an instruction or an acknowledgement for the destination sticker;

to transmit control messages stored within the stickers' storages that are not addressed to the stickers, to other stickers that are currently nearby to the stickers, within range of the stickers' wireless communicators;

to receive control messages stored within storages of other stickers that are currently nearby to the stickers, within range of the stickers' wireless communicators;

to store received control messages within the stickers' storages, when the received control messages are not addressed to the sticker; and to perform the instructions within received control messages, when the received control messages are addressed to the sticker.

14. A method of communication among a plurality of stickers, comprising:

for each one of a plurality of uniquely addressable stickers that are attached to goods that are being transported from respective origins to respective destinations such that the spatial relationship between the stickers is changing, each sticker including a non-transitory storage storing messages and including a wireless communicator transmitting and receiving messages, sporadically transmitting messages stored within the sticker's storage to all other stickers that happen to be currently nearby to the sticker, within range of the sticker's wireless communicator, wherein a message includes a source address, a destination address, and data;

sporadically receiving, by each sticker, messages stored within storages of all of the other stickers that are currently nearby to the sticker, within range of the sticker's wireless communicator;

determining, by each sticker, if a received message is addressed to the sticker;

if said determining is affirmative, then performing, by the sticker, instructions based on data in the received message; and otherwise, storing, by the sticker, the received message within the sticker's storage;

further transmitting, by each one of a subset of the stickers, messages stored in the sticker's storage to the messages' respective destination addresses via a network, when there is an access point for the network currently nearby the sticker, within range of the sticker's wireless communicator; and further receiving, by each one of the subset of the stickers, messages from a computer via the network, when there is an access point for the network currently nearby the sticker, within range of the sticker's wireless communicator.

15. The method of claim 14 wherein the data within a message comprises a current time, a current location and data relating to current properties of the source sticker.

16. The method of claim 14 wherein the data within a message comprises an instruction for activating a display coupled with the destination sticker designated in the message.

17. The method of claim 14 further comprising deleting, by the stickers, messages stored in the sticker's storage upon receiving acknowledgements that the messages successfully reached their destination addresses.

18. The method of claim 14 further comprising causing, by each sticker, a receiver of the sticker's wireless communicator to enter a sleep mode for a first designated period of time after successful completion of said transmitting.

19. The method of claim 14 further comprising causing, by each sticker, a transmitter of the sticker's wireless communicator to enter a sleep mode for a second designated period of time after successful completion of said receiving.

* * * * *